US005515233A

United States Patent [19]

Hofmann

[11] Patent Number: 5,515,233

[45] Date of Patent: May 7, 1996

[54] ELECTRONIC CIRCUIT OF AN ELECTROMAGNETIC CLUTCH

[75] Inventor: Manfred Hofmann, Contwig, Germany

[73] Assignee: Deere & Company, Moline, Ill.

[21] Appl. No.: 305,118

[22] Filed: Sep. 13, 1994

[30] Foreign Application Priority Data

Sep. 20, 1993 [DE] Germany .......................... 43 31 849.5

[51] Int. Cl.[6] .......................... H01H 47/12; A01D 69/08; F16D 48/06

[52] U.S. Cl. .......................... 361/160; 361/143; 361/180

[58] Field of Search .......................... 361/139, 143, 361/152, 160, 170, 180, 189, 166, 159, 267; 340/679, 684; 310/94; 460/1, 2; 56/10.2 R, DIG. 15; 192/84 R

[56] References Cited

U.S. PATENT DOCUMENTS

| | | | |
|---|---|---|---|
| 2,615,945 | 10/1952 | Jaeschke | 361/143 X |
| 3,581,156 | 5/1971 | Meudon | 361/154 |
| 3,586,920 | 6/1971 | Wakamatsu | 361/170 |
| 3,736,473 | 5/1973 | Pugh | 361/152 |
| 3,757,501 | 9/1973 | Bennett, Jr. et al. | 460/2 |
| 3,805,497 | 4/1974 | Ross | 56/10.4 |
| 3,805,798 | 4/1974 | Girodat | 460/1 |

*Primary Examiner*—Fritz M. Fleming

[57] ABSTRACT

An electric control circuit of an electromagnetic clutch includes a relay-controlled, two-position switch which operates, in response to a power source being disconnected from the switch relay and the clutch, to establish a path to ground through which the induced voltage of the clutch may be dissipated to thereby speed up the disengagement of the clutch once power thereto is discontinued. The control circuit may be that employed in a self-propelled forage harvester equipped with a metal detector, the latter including a normally closed relay switch which opens in response to metal being sensed to thereby de-energize the clutch and two-position switch relay.

5 Claims, 1 Drawing Sheet

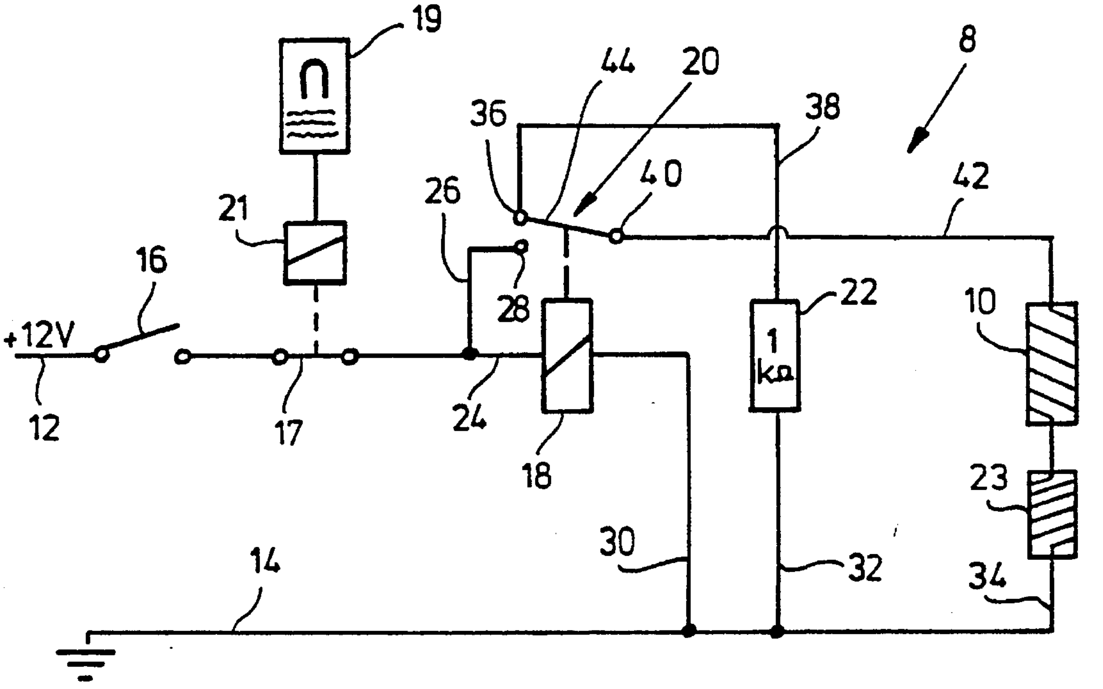
19
44
20
8
36
38
40
42
26
21
16
28
22
10
+12V
1
kΩ
12
17
24
18
23
30
32
14
34

ELECTRONIC CIRCUIT OF AN ELECTROMAGNETIC CLUTCH

BACKGROUND OF THE INVENTION

The present invention relates to electromagnetic clutches and more specifically relates to control circuits for such clutches.

Among other uses, electromagnetic clutches are applied to engage a drive line in a harvesting machine, in particular in a self-propelled forage harvester. Forage harvesters are often provided with a metal detector that generates a magnetic field through which the harvested crop flows. These metal detectors are incorporated in the electric circuit of the electromagnetic clutch and when metal is detected a signal is sent to disengage the electromagnetic clutch. However, the induction voltage resulting from operation of the metal detector can result in additional voltage being applied to the clutch which must be dissipated before the clutch will disengagement. This delay in the disengagement of the electromagnetic clutch is undesirable because the drive will continue to operate and possibly ingest the detected metal into the feed rolls of the harvester and possibly cause damage before the drive to the feed rolls is interrupted.

SUMMARY OF THE INVENTION

According to the present invention, there is provided an improved circuit for controlling the operation of an electromagnetic clutch.

An object of the invention is to provided a control circuit for an electromagnetic clutch which produces an immediate disengagement of the electromagnetic clutch.

A more specific object of the invention is to provide a control circuit for an electromagnetic clutch which, concurrently with disconnecting an operating voltage from the clutch coil for effecting disengagement of the clutch and consequent interruption of the drive controlled by the clutch, connects the clutch coil to ground to speed the dissipation of the induced voltage of the coil.

Yet another object of the invention is to provide an electromagnetic clutch together with a metal detector in an electrical circuit for controlling operation of a drive for a crop harvester and to provide the electrical circuit with relay switches which operate to simultaneously disconnect electrical power from the clutch coil and to provide a shunt connection of the coil to ground by way of a resistor so as to result in immediate dissipation of the induced voltage in the coil and, hence the immediate disengagement of the clutch and the drive which it controls.

Still another object of the invention is to provide an electromagnetic clutch control circuit as defined in the immediately preceding object and including a coil immediately preceding or following the coil of the clutch and having windings which are in the opposite direction to the windings of the clutch coil.

These and other objects of the invention will become apparent from a reading of the ensuing description together with the appended drawing.

BRIEF DESCRIPTION OF THE DRAWING

The sole figure is a schematic representation of an electromagnetic clutch control circuit constructed according to the principles of the present invention.

DESCRIPTION OF THE PREFERRED EMBODIMENT

The electromagnetic clutch control circuit of the present invention is shown applied to a crop harvester, such as an ensilage harvester, which utilizes a metal detector to discover metal that might be entrained in a flow of harvested crop passing to crop processors of the harvester.

Specifically, shown is an electrical control circuit 8 for an electromagnetic clutch 10 and including a current supply line 12, that is connected to the positive pole of a power source, not shown, for example a twelve-volt vehicle battery, and a grounding line 14. Connected in series in the supply line 12 are a manually operated main switch 16, a normally closed relay switch 17 and a relay 18 for controlling a two-position relay switch 20. Opening of the switch 17 is initiated by operation of a metal detector 19 which operates, in response to detection of metal entrained in a flow of harvested crop, to energize a relay 21 coupled to the switch 17. When the switches 16 and 17 are closed, current flowing in the line 12 is connected to a connection 24 coupled to the relay 18, which is coupled to the grounding line 14 by a connector 30. The relay 18 is thus energized and acts to move a bridge or element 40 of the switch 20 to a normal operating position wherein it engages a switch contact 28 at the end of a connector 26, branching from the line 12 at the connector 24, and, thus, establishes current flow to the electromagnetic clutch 10 by way of a switch center contact 40, the element 44, and a connector 42. The clutch 10 is connected to the grounding line 14 by a connector 34 containing a coil 23, and thus is engaged to effect a connection of a drive (not shown) for conveying harvested crop for further processing by elements of the forage harvester.

It is here noted that the wrappings of the coil 23 are in a direction opposite from the wrappings of the coil of the electromagnetic clutch 10 for the purpose of eliminating voltage peaks, during engaging and disengaging the electromagnetic clutch, that could affect neighboring components, such as the metal detector 19.

Opening either one of the switches 16 and 17 will de-energize the relay 18 and the electromagnetic clutch 10. Upon the relay 18 becoming de-energized, bridge 44 assumes a released position wherein it couples the electromagnetic clutch 10 to the ground line 14 in a path which is connected in parallel with the path through connector 34. Specifically, bridge 44 moves into engagement with a switch output contact 36 located at the end of a connector 38 leading to a one kilo-ohm resistor 22 that is in turn coupled to the grounding line by a connector 32. Thus, a path to ground is established through which the induced voltage of the electromagnetic clutch 10 may quickly dissipate thereby effecting immediate disengagement of the clutch so as to discontinue the drive to the harvested crop collecting elements of the forage harvester. Assuming it was the switch 17 which opened as a result of the metal detector 19 sensing the presence of metal in the stream of crop flowing into the forage harvester, then the immediate disengagement of the clutch will likewise result in immediate disengagement of the drive so as to prevent the metal from passing on into the harvester and causing damage to crop processing elements of the harvester.

Operation

Normal operation of a self-propelled forage harvester employing the control circuit 8 begins by the operator closing the main switch 16. At this time the metal detector controlled switch is also closed so the current supply is connected to energize the relay 18 which operates to move the bridge 44 of relay switch 20 into engagement with the contact 28 to thus complete the circuit to the electromagnetic clutch 10 and counter acting coil 23 both of which become energized. The clutch 10 then effects engagement of the drive for moving a stream of harvested crop to crop processing elements of the harvester.

In the event the metal detector 19 sensing metal in the stream of harvested crop, the detector will act to send an electrical signal to the relay 21 which acts to open the normally closed switch 17. This discontinues current flow to the relay 18 and to the electromagnetic clutch 10. Once the relay 18 is de-energized, the bridge 44 is released so that it moves into engagement with the contact 36 and thereby establishes a parallel electrical path to the ground line 14, by way of the connector 42, bridge 44, connector 38, resistor 22 and connector 32, through which the induced voltage in the electromagnetic clutch 10 may be rapidly dissipated thus resulting in a rapid disengagement of the clutch and the drive line controlled thereby.

I claim:

1. An electrical control circuit for an electromagnetic clutch, comprising: a current supply line adapted for being coupled to a power source; a grounding line; an electromagnetic clutch having a first end continuously connected to said grounding line; a two-position switch means including a bridge joined to a center contact, an input contact and an output contact, with the bridge being movable to connect the center contact either to the input contact or to the output contact; said input contact being connected to said current supply line; a first connector connected between the center contact and a second end of the clutch; and a second connector connected between the output contact and the grounding line in parallel with the continuous connection of the clutch with the grounding line, whereby engagement of said two-position switch bridge with said input contact will result in the clutch being energized and engaged, and engagement of said bridge with said output contact will result in the clutch being de-energized with its induced voltage being immediately dissipated to ground by way of said second connector.

2. The electromagnetic clutch control circuit defined in claim 1 wherein said second connector contains a resistor.

3. The electromagnetic clutch control circuit defined in claim 1 wherein said two-position switch means includes a relay coupled for effecting movement of said bridge from a released position in contact with the output contact and an energized position in contact with the input contact; and said relay being connected to said current supply line and to said grounding line.

4. The electromagnetic clutch control circuit defined in claim 1 wherein a normally closed metal detector switch is connected in said current supply line, with said two-position switch means being between said metal detector switch and said electromagnetic clutch; said two-position switch means including a two-position switch relay connected to said input contact and operable only when energized to move the bridge into engagement with said input contact, the bridge otherwise being engaged with said output contact; and a metal detector relay being connected to said metal detector switch and operable in response to metal being sensed to effect opening of said metal detector switch so as to discontinue the flow of current to said clutch and two-position switch relay whereby the bridge is released to engage the output contact to thus couple the de-energized clutch to the grounding line by way of said second connector.

5. The electromagnetic clutch control circuit defined in claim 1 and further including a coil connected in series with said clutch and having windings wrapped in a direction opposite to windings of said clutch to thereby counteract any tendency the induced voltage in the clutch might have to interfere with other circuit components.

* * * * *